US011232812B1

(12) United States Patent
Zheng et al.

(10) Patent No.: US 11,232,812 B1
(45) Date of Patent: Jan. 25, 2022

(54) AIR-BEARING SURFACE (ABS) DESIGN WITH SIDE FLOW BLOCKER FOR MITIGATING LUBE AND HYDROCARBON ACCUMULATION IN HARD DISK DRIVES (HDD)

(71) Applicants: SAE Magnetics (H.K.) Ltd., Shatin (HK); Headway Technologies, Inc., Milpitas, CA (US)

(72) Inventors: Guoqiang Zheng, San Ramon, CA (US); Ellis Cha, San Ramon, CA (US)

(73) Assignees: SAE Magnetics (H.K.) Ltd., Shatin (HK); Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/178,978

(22) Filed: Feb. 18, 2021

(51) Int. Cl.
*G11B 5/48* (2006.01)
*G11B 5/60* (2006.01)
*G11B 21/21* (2006.01)

(52) U.S. Cl.
CPC .......... *G11B 5/4826* (2013.01); *G11B 5/4833* (2013.01); *G11B 5/6082* (2013.01); *G11B 21/21* (2013.01)

(58) Field of Classification Search
CPC ... G11B 5/4826; G11B 5/6082; G11B 5/4833; G11B 21/21
See application file for complete search history.

(56) References Cited

U.S. PATENT DOCUMENTS

| | | | | |
|---|---|---|---|---|
| 6,661,612 B1* | 12/2003 | Peng | .................... | G11B 5/6005 360/235.8 |
| 7,227,723 B2 | 6/2007 | Nath et al. | | |
| 7,961,433 B2 | 6/2011 | Zheng et al. | | |
| 8,089,729 B2* | 1/2012 | Huang | ................. | G11B 5/6082 360/235.8 |
| 8,174,794 B2 | 5/2012 | Dorius | | |
| 8,184,405 B1* | 5/2012 | Zheng | .................... | G11B 5/102 360/266.3 |
| 8,203,805 B2* | 6/2012 | Huang | ................. | G11B 5/6082 360/235.4 |
| 8,289,653 B2* | 10/2012 | Huang | ................. | G11B 5/6005 360/235.6 |
| 8,593,763 B2* | 11/2013 | Scheppers | ............ | G11B 5/6005 360/235.7 |
| 8,988,830 B1* | 3/2015 | Peng | .................... | G11B 5/6082 360/236.1 |
| 9,190,090 B1 | 11/2015 | Zhang et al. | | |

(Continued)

*Primary Examiner* — Brian E Miller
(74) *Attorney, Agent, or Firm* — Saile Ackerman LLC; Stephen B. Ackerman

(57) ABSTRACT

A slider-mounted read/write transducer for a hard disk drive (HDD) has a topology that mitigates attraction and accumulation of lubricant and hydrocarbons during the HDD operation. The slider topology may include a pattern of cavities and channels symmetrically disposed about a central longitudinal axis. The slider may also have a transverse channel extending perpendicularly inward from an opening in each side edge of the slider to intersect a channel that extends longitudinally along a middle axis towards a leading-edge pad in which a read/write transducer is embedded. The ends of the transverse channel open into an air-carrying groove extending vertically upward in the side of the slider in which a side flow blocker (SFB) restricts the air flow into the channel portion.

19 Claims, 5 Drawing Sheets

(56) References Cited

U.S. PATENT DOCUMENTS

| | | | |
|---|---|---|---|
| 9,892,746 B1* | 2/2018 | Zheng | H01L 21/31 |
| 9,940,960 B2 | 4/2018 | Cha et al. | |
| 10,748,576 B2 | 8/2020 | Higashiya et al. | |
| 2003/0058578 A1* | 3/2003 | Boutaghou | G11B 5/6005 360/235.8 |
| 2004/0095680 A1* | 5/2004 | Takahashi | G11B 5/6005 360/236.3 |
| 2005/0237668 A1* | 10/2005 | Cha | G11B 5/6082 360/235.6 |
| 2008/0123220 A1* | 5/2008 | Kajitani | G11B 5/6005 360/236.3 |
| 2009/0059432 A1* | 3/2009 | Kubotera | G11B 5/6005 360/236.6 |
| 2009/0141402 A1* | 6/2009 | Hanyu | G11B 5/6082 360/235.5 |
| 2009/0219651 A1* | 9/2009 | Zheng | G11B 5/6005 360/236.5 |
| 2009/0244781 A1* | 10/2009 | Imamura | G11B 5/6005 360/235.4 |
| 2009/0310259 A1* | 12/2009 | Hanyu | G11B 5/6005 360/235.6 |
| 2010/0128395 A1* | 5/2010 | Dorius | G11B 5/6082 360/235.5 |
| 2010/0226035 A1* | 9/2010 | Huang | G11B 5/6082 360/75 |
| 2010/0238592 A1* | 9/2010 | Mizutani | G11B 5/6005 360/235.4 |
| 2011/0058275 A1* | 3/2011 | Kohira | G11B 5/6005 360/75 |
| 2011/0317311 A1* | 12/2011 | Kushima | G11B 5/6082 360/235.7 |
| 2012/0275051 A1* | 11/2012 | Scheppers | G11B 5/6005 360/96.61 |
| 2014/0168820 A1* | 6/2014 | Rajasekharan | G11B 5/6082 360/235.6 |
| 2017/0345452 A1* | 11/2017 | Cha | G11B 5/6082 |
| 2019/0259420 A1* | 8/2019 | Furutani | G11B 33/1446 |
| 2019/0267038 A1* | 8/2019 | Higashiya | G11B 5/6041 |
| 2020/0020355 A1* | 1/2020 | Pan | G11B 21/21 |

* cited by examiner

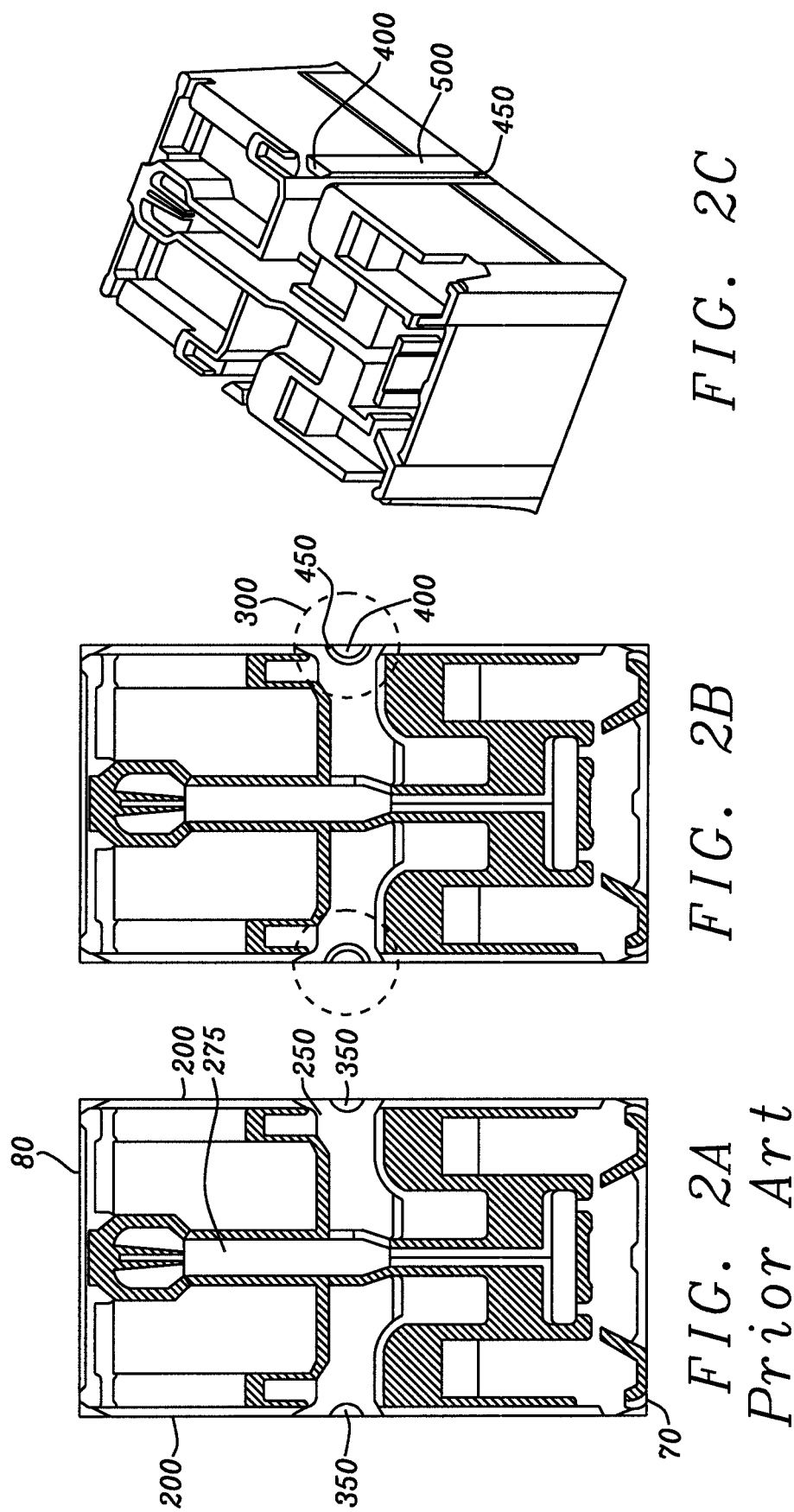

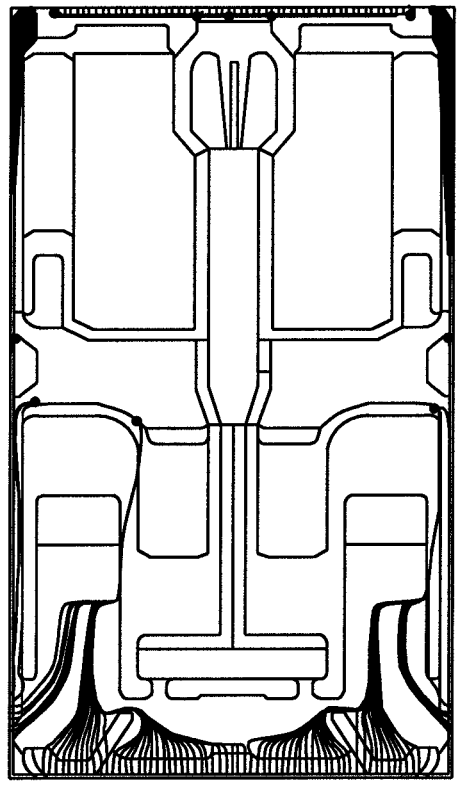
FIG. 3A Prior Art
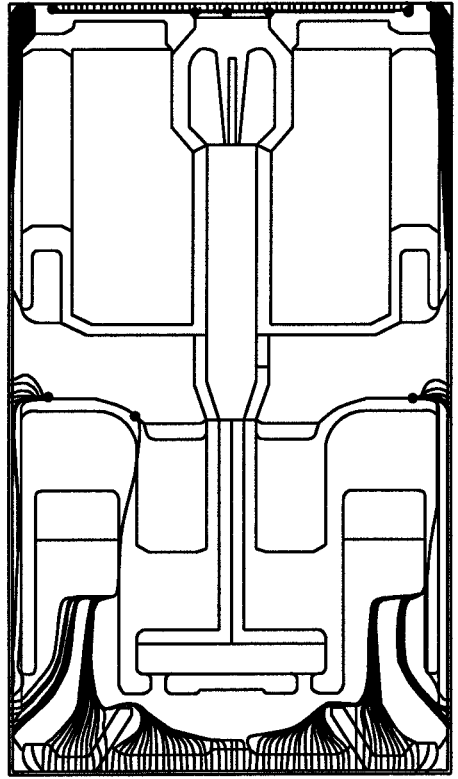
FIG. 3C
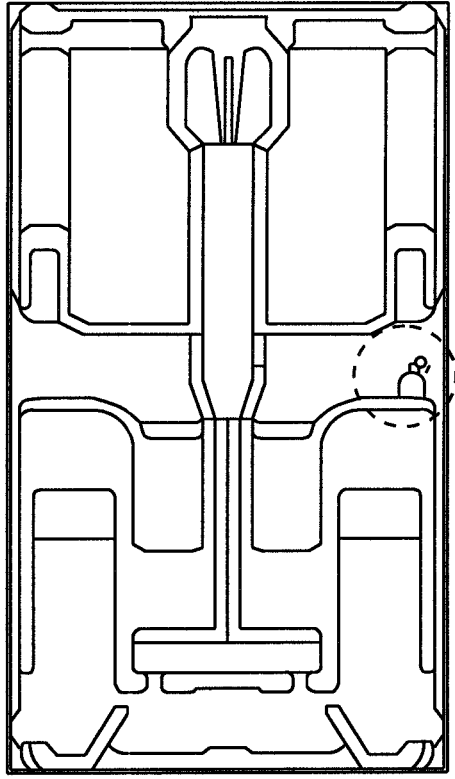
FIG. 3B Prior Art
FIG. 3D

AIR-BEARING SURFACE (ABS) DESIGN WITH SIDE FLOW BLOCKER FOR MITIGATING LUBE AND HYDROCARBON ACCUMULATION IN HARD DISK DRIVES (HDD)

BACKGROUND

1. Technical Field

This disclosure relates to slider-mounted magnetic read/write transducers that write on magnetic recording media, particularly to the air-bearing surface (ABS) topography of such write heads and methods to improve their performance by reducing lubricant and hydrocarbon accumulation.

2. Description

For achieving a higher areal density capacity (ADC) of a magnetic recording disk, active read/write clearance has been dramatically reduced from approximately 10 nm to approximately sub nm of passive fly height. This has been accomplished by state-of-the-art, fly-on-demand (FOD) or dynamic-fly-height (DFH) technology, with the assistance of local heating protrusion of the ABS surface of the slider-mounted read/write transducer. Consequently, what is now needed is a slider ABS design that will continue to function reliably at these ultra-low fly heights, even in the presence of lubricant and hydrocarbon contaminations that result from these contaminants on disk surfaces and other drive component parts migrating to the slider ABS as shown in FIG. 1.

Referring to FIG. 1 there is shown a schematic illustration of the side view of a slider 10 in aerodynamic flight over the surface of a rotating magnetic recording media showing the head/media interface during HDD operation. The media is shown here as comprising four distinct layers, a composite underlayer/substrate, 20, which supports a magnetic recording layer 30, a hard, protective surface layer 40 and a thin layer of lubricant 50 deposited on the surface layer 40. The section of the rotating recording media is moving to the right in the same direction as the airflow, which is shown as a large arrow 60. The airflow direction is into the edge of the slider denoted its leading edge 70 and the operational components of the read/write head are mounted in the trailing edge of the slider 80, which is the edge past which the airflow finally leaves. A schematic broken-line curve 75 is meant to indicate the thermal protrusion shape of the ABS when the DFH heating is activated, which brings the read/write elements to their closest approach (active clearance) to the surface of the disk (indicated by the small double-ended arrow 85). When the heating element is inactive, the slider is at its passive clearance and the read/write elements are at their farthest from the disk surface (large double-ended arrow 95). As shown in the illustration, the largest portion of the slider 100 is formed of AlTiC and the trailing edge portion 110, holding the active elements 120 of the read/write transducer is formed of Al2O3. The active elements 120 (not shown in detail) include the read head, the write head, shields and the various heaters required to activate DFH or FOD.

Lubricant and hydrocarbon that is picked up on the slider ABS generally travels towards the trailing edge of the slider due to the Couette component of the shear stress driven by the rotational velocity of the disk. In addition, lubricant and hydrocarbon can also migrate into the air groove due to the Poiseulle component of shear stress driven by the ABS pressure gradient. Such fluid contaminants usually follow the airflow streamlines and accumulate at the stagnation points given an advanced negative pressure ABS design. The buildup of lubricant and hydrocarbon contaminants not only disrupt airflow causing clearance changes and read/write errors, but also bridge head/disk spacing through the bulk of droplets, leading to head/disk interference (HDI) and drive failure. Therefore, there is a need to explore new ABS features to minimize the collections of lubricant and hydrocarbon contaminations for drive reliability improvement.

While the prior arts include several schemes to provide hydrocarbon control methods and backflows at the trailing edge of the slider, where all the elements of the transducer are embedded in a center pad. However, these methods have not been successful as other airflow patterns form and build up lubricant hydrocarbon droplets.

SUMMARY

It is therefore an object of this disclosure to fabricate a slider-mounted perpendicular magnetic recording (PMR) transducer (although other transducers are equally possible) where the slider has an air-bearing surface (ABS) topology and side-edge surface topologies that will eliminate or strongly mitigate the problem of lubricant and hydrocarbon particle capture and accumulation.

This object will be achieved by a topological design of a slider ABS and its side edges that will influence the airflow and prevent regions of air stagnation where buildups tend to occur. A prior art version of a slider that will not meet the objectives of this disclosure is shown as FIG. 2A, looking up into the ABS topology. Different shading densities represent the depths of the grooves and cavities relative to the upper-most surface of the ABS. The less-dense the shading, the deeper is the etched region with respect to the upper surface, with no shading at all being the deepest feature. The top (in the figure) of the slider 80 is its trailing edge and the bottom 70 is its leading edge. The topology of the slider ABS is formed, using a well-known vacuum etching process, with multiple recessed layers forming cavities and grooves and making it a negative pressure slider. Typical dimensional ranges of the presently disclosed slider are between approx. 0.5 and 1.5 mm (millimeters) in length, between approx. 0.5 and 1 mm (millimeters) in width and between approx. 0.1 and 0.3 mm (millimeters) in thickness.

The horizontal cross-sectional shape is the air-bearing surface (ABS), as though seen looking up from a disk. The ABS view is bounded peripherally at the bottom 70, by the leading edge (LE), which is the edge towards which disk rotation (and air flow) is directed (see FIG. 1). The upper edge 80 is termed the trailing edge (TE), it is the region that holds the read/write elements (the transducer), past which the air-flow exits.

The leading and trailing edges are separated by side edges 200. The surface topography (grooves and cavities) is designed so that the flow of air between the ABS and the rotating disk creates pressure gradients that maintain aerodynamic stability and flying height stability between the ABS of the slider and disk surface as the slider moves radially across the disk surface and encounters velocity gradients in the air flow.

Of particular note is a deep air-groove 250 that runs transversely from one side edge 200 to the other. This groove is an air-carrying groove during HDD operation as it provides airflow into the body of the slider. The groove 250 feeds air into a longitudinal groove 275 that carries air towards the trailing edge 80 of the slider. Also of note are vertical, from bottom of the slider to the ABS, side grooves 350 on each side edge 200 of the slider (the side grooves are shown here only as semi-circular openings in the floor of the transverse groove 250). These side grooves are very narrow, between approximately 10-30 microns (μm) and vary in depth with different slider types. During HDD operation these side grooves carry air into the transverse groove 250 and also play a role of stabilizing the slider as its skew angle shifts during motion across a disk.

Note that the side grooves 350 intersect the floor (shown as semicircular groove cross-sections) of the transverse groove 250. Note also that a structural "groove" will be called a a functional "air-groove" because it functions to provide air-flow when the HDD is operating.

BRIEF DESCRIPTION OF THE DRAWINGS

FIG. 2A is a 2-dimensional schematic view of the underside topology (air bearing surface (ABS) region) of an exemplary slider-mounted read/write transducer showing the grooves and cavities required to provide the slider with aerodynamic stability as it flies over a disk surface. The depths of the various topological features are represented by shadings, with the lightest shading being the greatest depth. A deepest transverse groove that has two sections that run transverse to the length of the slider and supports air-flow is a feature of this design.

FIG. 2B shows the exemplary slider of FIG. 2A with the deep air-carrying channel that is transverse to the length of the slider now being partially blocked at both of its entry openings along the sides of the slider by side-flow blocker (SFB).

FIG. 2C is a 3-dimensional schematic view of the slider of FIG. 2B showing the SFB feature embedded in the air groove along the side edge of the slider where it partially blocks airflow into the transverse deep groove.

FIGS. 3A and 3C is the same exemplary slider illustrated in FIGS. 2A and 2B, with and without the SLB respectively, showing simulated regions of air stagnation in 3A during HDD operation.

FIGS. 3B and 3D is the same exemplary slider illustrated in FIGS. 2A and 2B, with and without the SLB respectively, showing simulated regions of air stagnation in 3B (encircled) and debris buildup during HDD operation.

DETAILED DESCRIPTION

Figure 1:
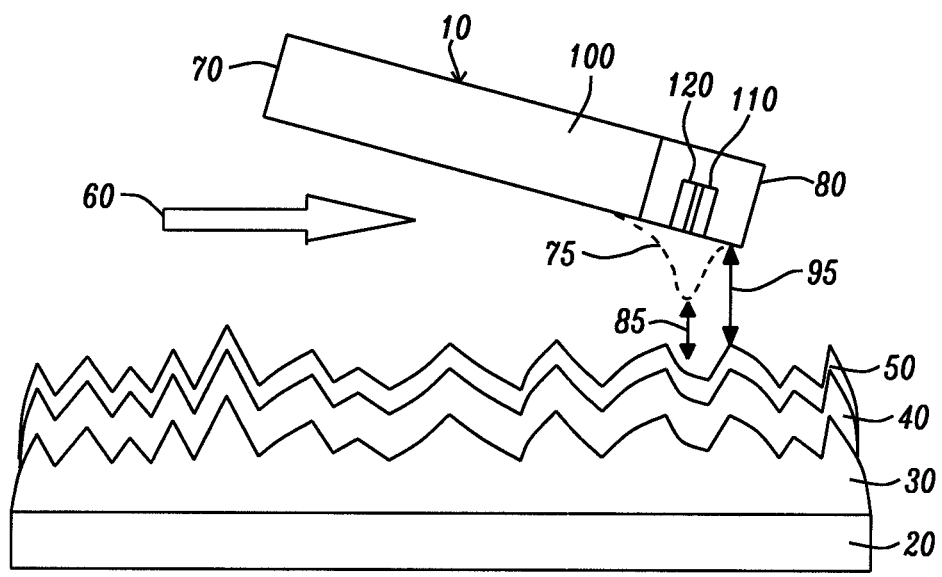
FIG. 1 is a schematic representation of a side view of an exemplary prior art slider-mounted read/write head (transducer) in flight over an operational (rotating) recording media (a magnetic disk). Four levels of the surface of the disk are shown as well as the airflow direction between the slider and the media.

The prior arts include several slider designs that provide lubrication and hydrocarbon control methods by providing structures to create back flows (flows away from the transducer elements) at the trailing edge of slider. It is at the extreme trailing edge of the slider where all the components of the transducer elements are embedded in a center pad. However, it is not only back flows that can build up lubricant and hydrocarbon droplets, but also side flows and both of these are responsible for poor performance and drive problems.

Embodiments of the present disclosure present an approach for mitigating unwanted effects of side flows at the inner or outer edge of slider. One embodiment provides an air bearing surface (ABS) design with side flow blockers (SFB) for redirecting or restricting air flows and thus destroying the stagnations at the side edges of the slider. Embodiments of this approach can significantly lower the risk level of lubricant and hydrocarbon accumulations on the slider ABS and further improve the reliability of head/disk interface.

The ABS topology required for aerodynamically supporting a slider flying over a spinning disk is formed by the use of known vacuum etching processes that produce multiple recessed layers at various depths. FIGS. 2B and 2C show, schematically, in two and three dimensions respectively, an embodiment of the present disclosure. Here, only one of two side flow blockers (SFB) 500 is shown in FIG. 2C.

Each SFB 500 is positioned against the surface 450 of a vertical air groove formed in a slider side edge (see dashed circles 300 in FIG. 2B surrounding the tops 400 of each of the SFBs 500 positioned in its surrounding groove 450). The top surfaces 400 of these SFB pads 500, inserted in their air-grooves 450, typically have a lower elevation, about 0.1 to 4 microns lower than the ABS top surface and are shown partially surrounded by an annular surface region 450 formed by the curved walls of the recessed groove and possibly isolated from direct contact with the slider body by a space between the walls of the recessed groove and the surface of the SFB. Note in FIG. 2B the small semicircle 400 is the periphery of the top of the SFB while the larger semicircular annulus 450 is the surface of the vertical air groove.

As is shown in FIG. 2A, a deep air-groove 250 runs transversely across the center of the slider in two portions beginning at the side edges. Each portion terminates against the walls of a longitudinal air-groove 275 that extends towards the trailing edge of the slider 80 where the transducers are located (not shown). The SFB (500 in FIG. 2C) is a solid prism of uniform cross-section (semicircular here) that restricts the flow of air to the annular region 450. In the absence of the SFB, the air would normally flow unrestricted through an empty vertical side air-groove, 350 in FIG. 2A, into the transverse air-groove 250 and create regions of stagnation where the exit of the vertical side air-groove intersects the base of the transverse air-groove.

The three-dimensional view of FIG. 2C shows a semicircular cross-section SFB pad as 500 surrounded by narrow spaces 450 that separate the SFB from the slider wall in the vertical groove. This SFB pad minimizes any adverse impact on slider aerodynamics, as well as fitting into the outlet (where it intersects the side edge) of transverse air-groove 250 to maximize its functionality as a side-flow restrictor at the opening of the transverse groove. In this way, the SFB pads will ensure sufficient shear stress to break up side flow stagnations and remove the collections of lubricant and hydrocarbon contaminations in the groove, without adverse effects on flying attitude.

Typically the top of the SFB is between approximately 0.1 and 4.0 microns (μm) below the top ABS plane. Typical dimensional ranges of the slider are between approx. 0.5 and 1.5 mm (millimeters) in length, between approx. 0.5 and 1 mm (millimeters) in width and between approx. 0.1 and 0.3 mm (millimeters) in thickness, which depends also on the form factor of the slider.

The vertical groove in which the SFB sits is between approx. 5 and 30 microns (μm) in width and it has the same length as the SFB. Correspondingly the width of the SFB ranges from approx. 5 microns to 50 microns while its length ranges from approx. 5 microns to 300 microns.

FIGS. 3A and 3B, show simulations of regions of airflow stagnation (A) and regions of resulting contamination (B) in a prior art embodiment with no SFB. FIGS. 3C and 3D, make the same comparisons but with the present embodiment SFB feature. As expected, there is no obvious contamination (FIG. 3D) observed in the slider region of the ABS having the SFB feature in the region of the transverse air-groove. In FIG. 3B a dashed-line circle where the side air-groove empties into the transverse air-groove shows contaminants gathering in the region where airflow stagnates (see FIG. 3A). However, the bulk of the airflow lines in FIG. 3A and FIG. 3C are the same indicating that the SFB does not adversely affect the slider aerodynamics.

In sum, the spirit of the present approach of inserting the SFB into the vertical side air-groove is to minimally affect slider aerodynamics as indicated by FIGS. 3A and 3C, but to mitigate the stagnation caused by streamlines. If the blocker completely covers the entrance to the transverse groove 250, strong suction could result which would drastically change ABS performance of the slider. The important effect of the SFB is at the stagnation point at the opening of the transverse groove (250), where the SFB partially blocks its opening and mitigates stagnation caused by streamlines.

Although a particular ABS topography is shown as an embodiment herein, the disclosure is not limited to that particular design. With the scheme of a photomask and photolithography, a similar SFB design could be easily transferred to any air-bearing slider surface through the use of the etching process.

Preferably, the elevation of the SFB (the height of its top surface) is lower than the top plane of the air-bearing surface, ABS, of the slider, but higher than the base of the transverse deep air groove (250 in FIG. 2A). This can be managed or adjusted via the combination of different photo masks. The SFB pad is also shaped to fit into the outlet of the side air-groove in the slider side edge, typically producing cross-sections that are trapezoidal, rectangular or tri-angle-like, that can fit the outlet shape of the transverse-air groove well. Furthermore, the SFB pad is totally isolated from other ABS pads and surrounded by, but not contacting, the trench surface of the vertical side groove. The pad-to-pad space is generally determined by the process capability of ion milling (IM) or reactive ion etching (RIE). However, it should be understood that although the illustrated designs are preferred, and SFB pads are not limited to those specific designs. It is more desirable that the SFB of the present disclosure works flawlessly with other back flow blockers so that the combination is sufficiently capable of providing an ultimate restrictor of airflow to reduce the buildup of lubricant and hydrocarbon contaminations due to both back flow and side flow on slider air-bearing surface.

Figure 4:
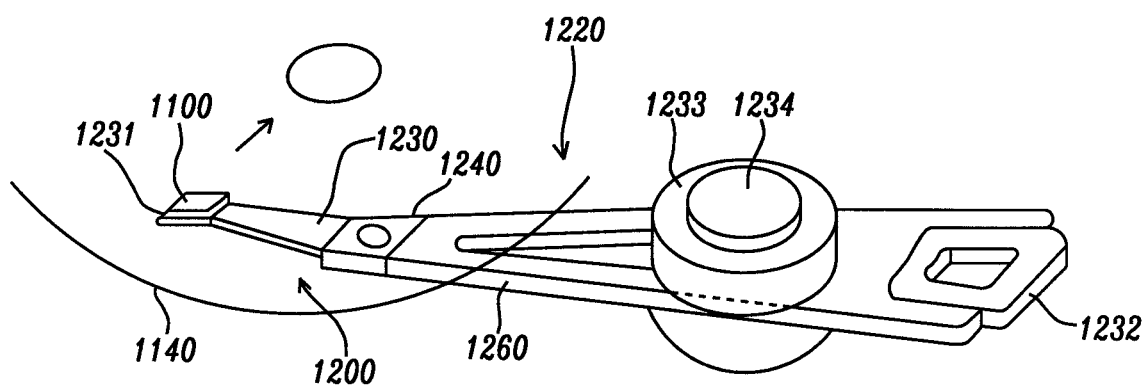
FIG. 4-6 show individual schematic views of the portions of the slider-mounted read/write transducer with a side-flow blocking (SFB) feature mounted into an operational harddisk drive (HDD).
Figure 5:
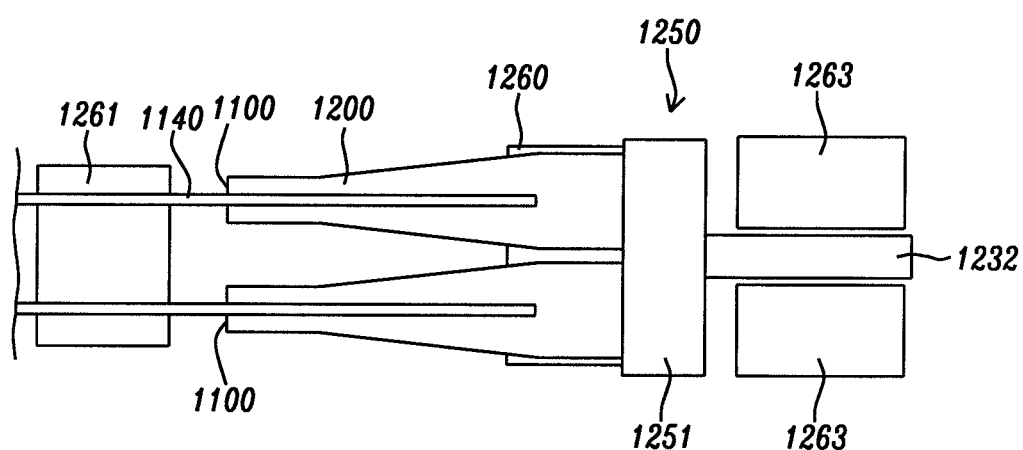
Figure 6:
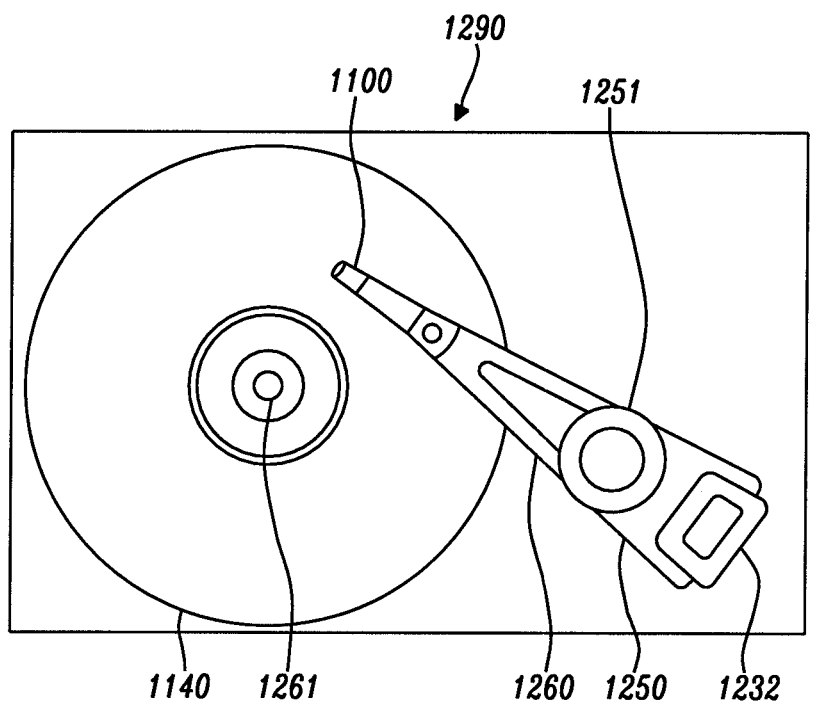

The three figures, FIGS. 4-6, schematically show the mounting structure of the slider-mounted PMR transducer, incorporating the presently disclosed side flow blockers (SFB) to reduce lubricant and hydrocarbon buildup. The purpose of these figures and the following description is to show that the present slider mounts and fulfills its objects in an operational HDD.

FIG. 4 shows a head gimbal assembly (HGA) 1200 that includes (among other possibilities) a slider-mounted PMR writer 1100, the slider now providing aerodynamic support to the writer when it moves above or below an operational disk recording medium 1140. There is also shown a suspension 1220 that elastically supports the slider-mounted writer 1100. The suspension 1220 has a spring-like load beam 1230 made with a thin, corrosion-free elastic material like stainless steel. A flexure 1230 is provided at a distal end of the load beam and a base-plate 1240 is provided at the proximal end. The slider mounted PMR writer 1100 is attached to the load beam 1230 at the flexure 1231 which provides the writer with the proper amount of freedom of motion. A gimbal part for maintaining the PMR transducer at a proper level is provided in a portion of the flexure 1231 to which the PMR 1100 is mounted.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1232 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

Referring next to FIG. 5, there is shown a head stack assembly 1250 and a magnetic recording apparatus in which the slider-mounted PMR writer 1100 is contained. The head stack assembly is an element to which the HGA 1200 is mounted to arms of a carriage having a plurality of arms for engaging with a plurality of disks 1140. The plurality of disks are mounted on a spindle 1261. FIG. 5 is a side view of this assembly and FIG. 6 is a plan view of the entire magnetic recording apparatus.

Referring finally to FIG. 6, the head stack assembly 1250 is shown (in an overhead view) incorporated into a magnetic recording apparatus 1290. The magnetic recording apparatus 1290 has a plurality of magnetic recording media 1114 mounted on a spindle motor 1261. Each individual recording media 1140 has two TAMR elements 1100 arranged opposite to each other across the magnetic recording media 1140 (shown clearly in FIG. 5). The head stack assembly 1250 and the actuator (except for the write head itself) act as a positioning device and support the PMR heads 1100. They also position the PMR heads correctly opposite the media surface in response to electronic signals. The read/write head records information onto the surface of the magnetic media by means of the magnetic pole contained therein.

As is understood by a person skilled in the art, the present description is illustrative of the present disclosure rather than limiting of the present disclosure. Revisions and modifications may be made to methods, materials, structures and dimensions employed in forming and providing a slider-mounted read/write transducer having an ABS topography that mitigates the capture and accumulation of lubricant and hydrocarbons by means of a side flow blocking (SFB) device that restricts airflow paths that enter the slider and mitigates areas of stagnation, while still forming and providing such a device and its method of formation in accord with the scope of the present disclosure as defined by the appended claims.

What is claimed is:

1. A slider-mounted read/write transducer for a hard-disk drive (HDD) comprising:

a slider body having an ABS (air bearing surface) plane bounded by a leading edge, a trailing edge and side edges and having a surface topology for creating aerodynamic stability during said HDD operation;

a transverse air-groove, perpendicular to each of said side edges, said transverse air-groove having an opening in each side edge;

a vertical air-groove in each side edge, wherein said vertical air-groove has a surface intersecting a base of said transverse air-groove;

a side flow blocker (SFB) embedded in each said vertical air-groove and spaced from said vertical air-groove surface.

2. The slider-mounted read/write transducer for a hard-disk drive (HDD) of claim 1 wherein an upper end of each said vertical air-groove terminates in a base of said transverse air-groove, forming an opening in said base where said base intersects said side edge.

3. The slider-mounted read/write transducer for a hard-disk drive (HDD) of claim 2 wherein said vertical groove in which the SFB is embedded is between approx. 5 and 30 microns (μm) in width and has the same length as the SFB which is between approximately 5 microns and 300 microns.

4. The slider-mounted read/write transducer for a hard-disk drive (HDD) of claim 2 wherein wherein the width of said SFB ranges from approx. 5 microns to 50 microns while its length ranges from approx. 5 microns to 300 microns.

5. The slider-mounted read/write transducer for a hard-disk drive (HDD) of claim 1 wherein an upper end of each said SFB is higher than the base of said transverse air-groove but lower than said ABS plane by between approximately 0.1 and 4 microns.

6. The slider-mounted read/write transducer for a hard-disk drive (HDD) of claim 5 wherein said constant cross-sectional shape of said SFB is a trapezoid, a rectangle, a triangle or a circle.

7. The slider-mounted read/write transducer for a hard-disk drive (HDD) of claim 5 wherein an upper end of each said SFB rises above a lower edge of said opening of said transverse air-carrying groove and partially obstructs the opening of said transverse groove thereby eliminating regions of airflow stagnation at the entrance to said groove.

8. The slider-mounted read/write transducer of claim 5 wherein, during HDD operation, each said SFB restricts a flow of air entering said maximum depth grooves whereby patterns of airflow are changed, said transverse groove transfers less lubricant and hydrocarbons into the body of said slider where they would have been captured and accumulated.

9. The slider-mounted read/write transducer of claim 5 wherein the horizontal cross-sectional shape of said SFB creates uniform spaces between walls of said air channel and sides of said SFB.

10. The slider-mounted read/write transducer for a hard-disk drive (HDD) of claim 1 wherein said SFB restricts air-flow from said vertical air-groove into said transverse air-groove during HDD operation.

11. The slider-mounted read/write transducer for a hard-disk drive (HDD) of claim 1 wherein said SFB is a uniform solid prism of constant cross-sectional shape that does not contact walls of said side vertical air groove, being separated from said walls by the process capability of ion milling (IM) or reactive ion etch (RIE).

12. The slider-mounted read/write transducer for a hard-disk drive (HDD) of claim 1 wherein said SFB is separated from walls of said vertical air-carrying groove by a surrounding space whereby airflow in said groove is restricted.

13. The slider-mounted read/write transducer for a hard-disk drive (HDD) of claim 1 wherein typical dimensional ranges of the slider are between approx. 0.5 and 1.5 mm (millimeters) in length, between approx. 0.5 and 1 mm (millimeters) in width and between approx. 0.1 and 0.3 mm (millimeters) in thickness.

14. A magnetic recording apparatus, comprising:
the head gimbal assembly-mounted slider of claim 13;
a magnetic recording medium positioned opposite to said slider;
a spindle motor that rotates and drives said magnetic recording medium;
a device that supports said slider and that positions said slider relative to said magnetic recording medium.

15. The slider-mounted read/write transducer for a hard-disk drive (HDD) of claim 1; wherein:
said transverse groove is formed in two mirror-symmetric transverse portions, each portion extending perpendicularly inward from an opening in a side edge, part way across said slider, and terminating at a third longitudinal air groove portion extending longitudinally along said axis of symmetry towards said trailing edge and terminating at a pad within which is embedded a read/write transducer; and wherein
two identical vertical grooves, one formed in each said side edge, extend vertically upward, perpendicular to said ABS plane, along each of said side edges from a bottom of said side edge, terminating at a base of said maximum depth groove where said maximum depth groove opens in said side edge.

16. The slider-mounted read/write transducer of claim 1 wherein a minimal space between sides of said SFB and walls of said vertical air-carrying groove is governed by capability of ion milling (IM) or reactive-ion etching (RIE) to maintain dimensionality.

17. The slider-mounted read/write transducer of claim 1 wherein said transducer is a perpendicular magnetic recording (PMR) head.

18. A head gimbal assembly, comprising
the slider-mounted read/write transducer of claim 1;
a suspension that elastically supports said slider-mounted transducer, wherein
said suspension has a flexure to which said slider is joined, a load beam with one end connected to said flexure and a base plate connected to the other end of said load beam.

19. A method to reduce surface damage to a disk or head-disk interference HDI during hard disk drive (HDD) operation, the method comprising:
providing a slider-mounted read/write transducer for a hard-disk drive (HDD) comprising:
a slider body having an ABS (air bearing surface) bounded by a leading edge, a trailing edge and side edges and a surface topology for creating aerodynamic stability during said HDD operation;
a transverse air-carrying groove, perpendicular to said side edges, having an opening in each side edge;
a vertical air-flow groove on each side edge;
a side flow blocker (SFB) embedded in each vertical air-flow groove,
said side-flow blocker extending upward so that an uppermost portion partially blocks an inlet opening into said transverse air-flow groove; whereby
airflow into said transverse air-flow groove is restricted and airflow patterns within ABS topology of said slider are disrupted and regions of airflow stagnation and consequent lubricant and particulate accumulation is mitigated and surface damage to an operational recording disk is reduced or eliminated.

* * * * *